Figure 5:
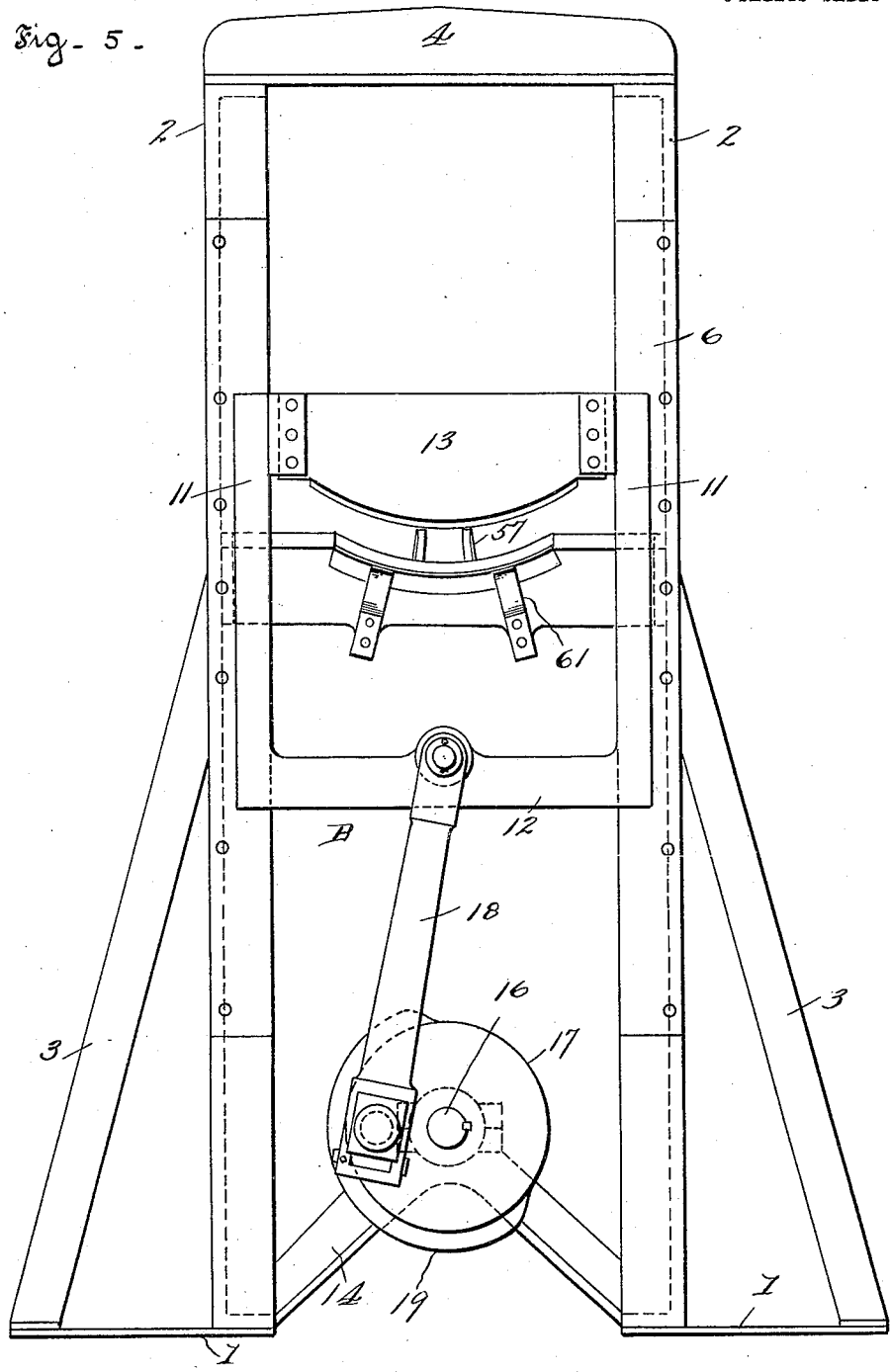

L. Y. WILLIAMS.
MACHINE FOR MAKING HEAD LININGS.
APPLICATION FILED APR. 17, 1906. RENEWED MAY 29, 1908.
908,720.
Patented Jan. 5, 1909.
8 SHEETS—SHEET 1.
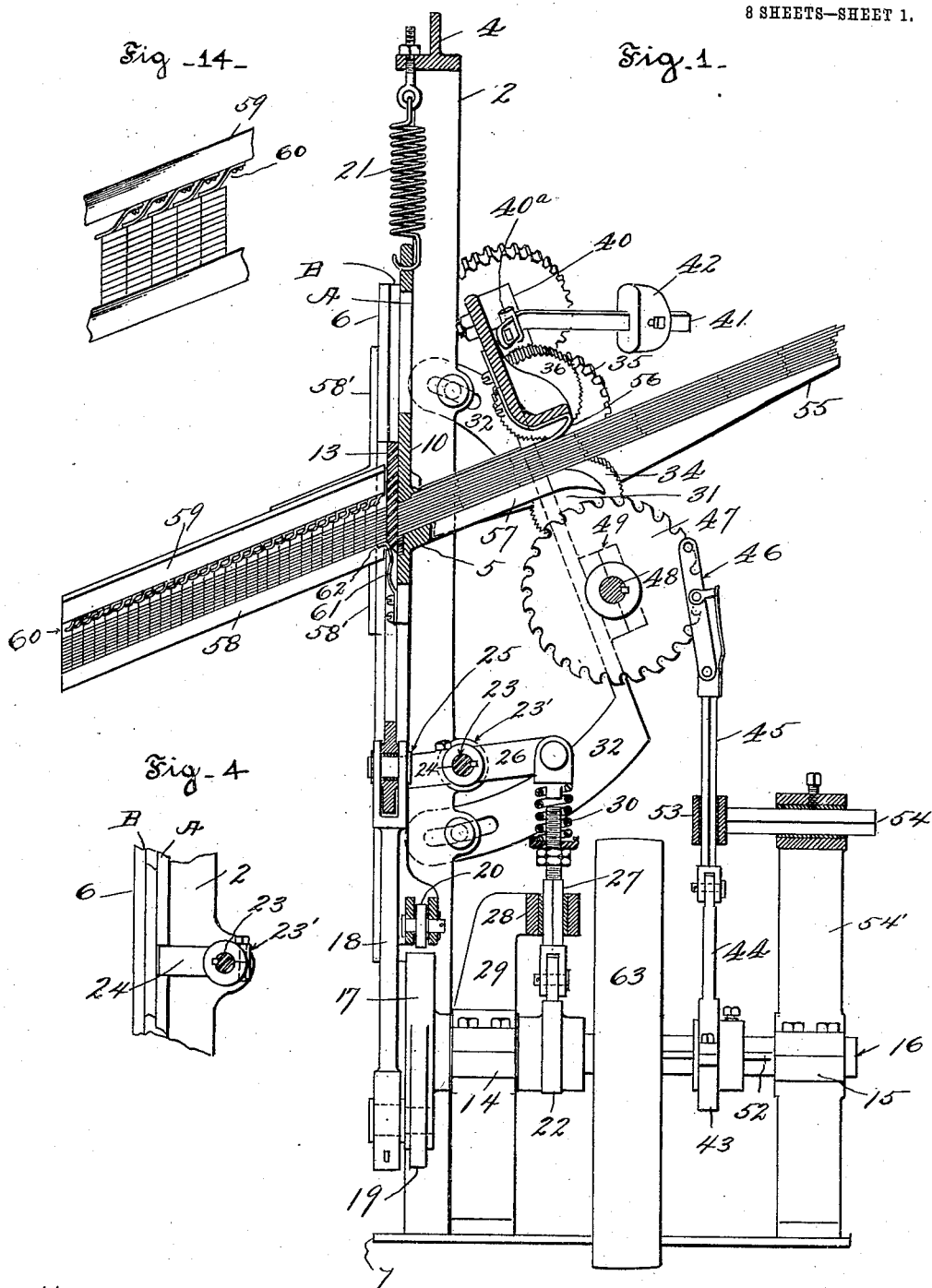

L. Y. WILLIAMS.
MACHINE FOR MAKING HEAD LININGS.
APPLICATION FILED APR. 17, 1906. RENEWED MAY 29, 1908.
908,720.
Patented Jan. 5, 1909.
8 SHEETS—SHEET 2.
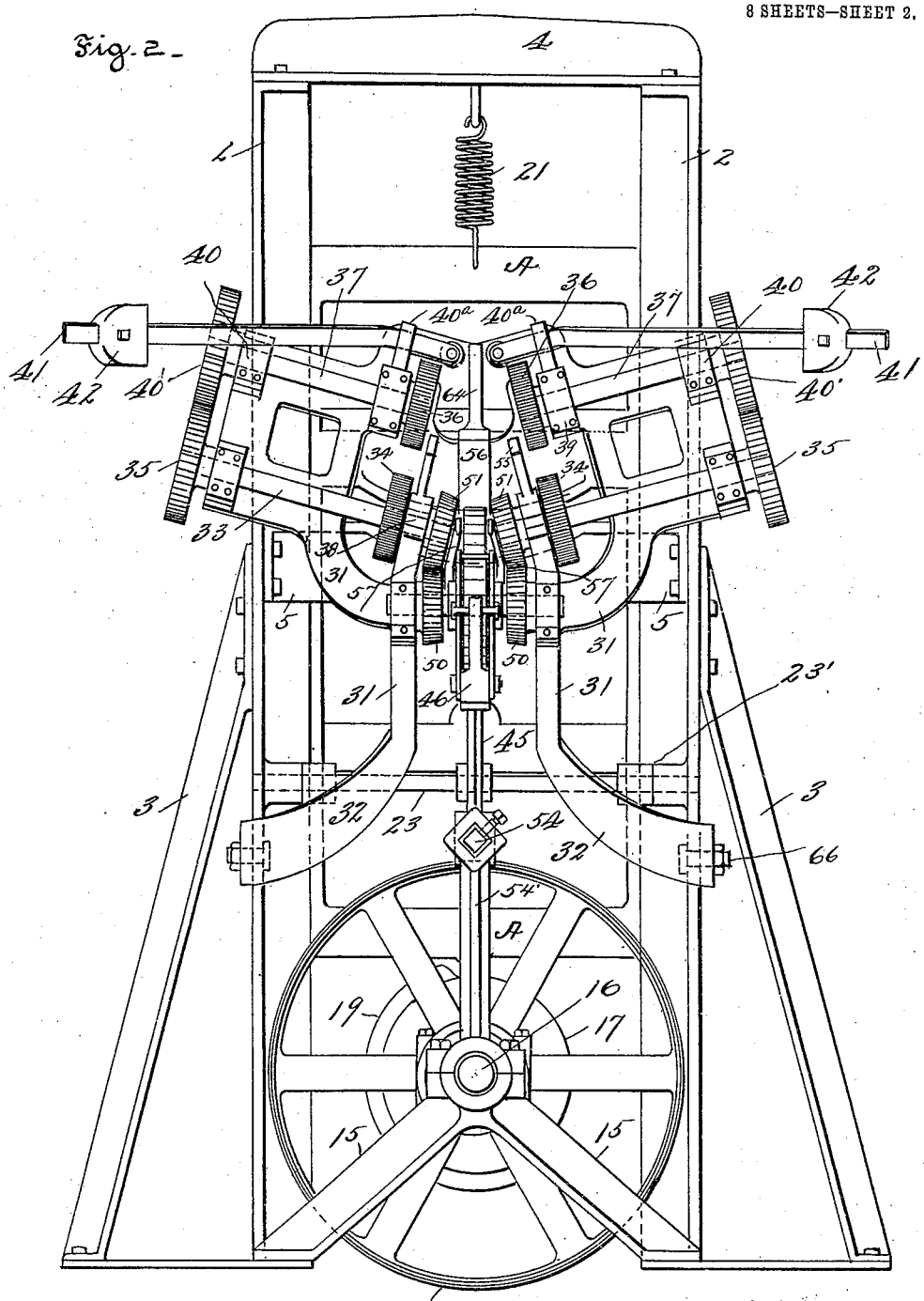

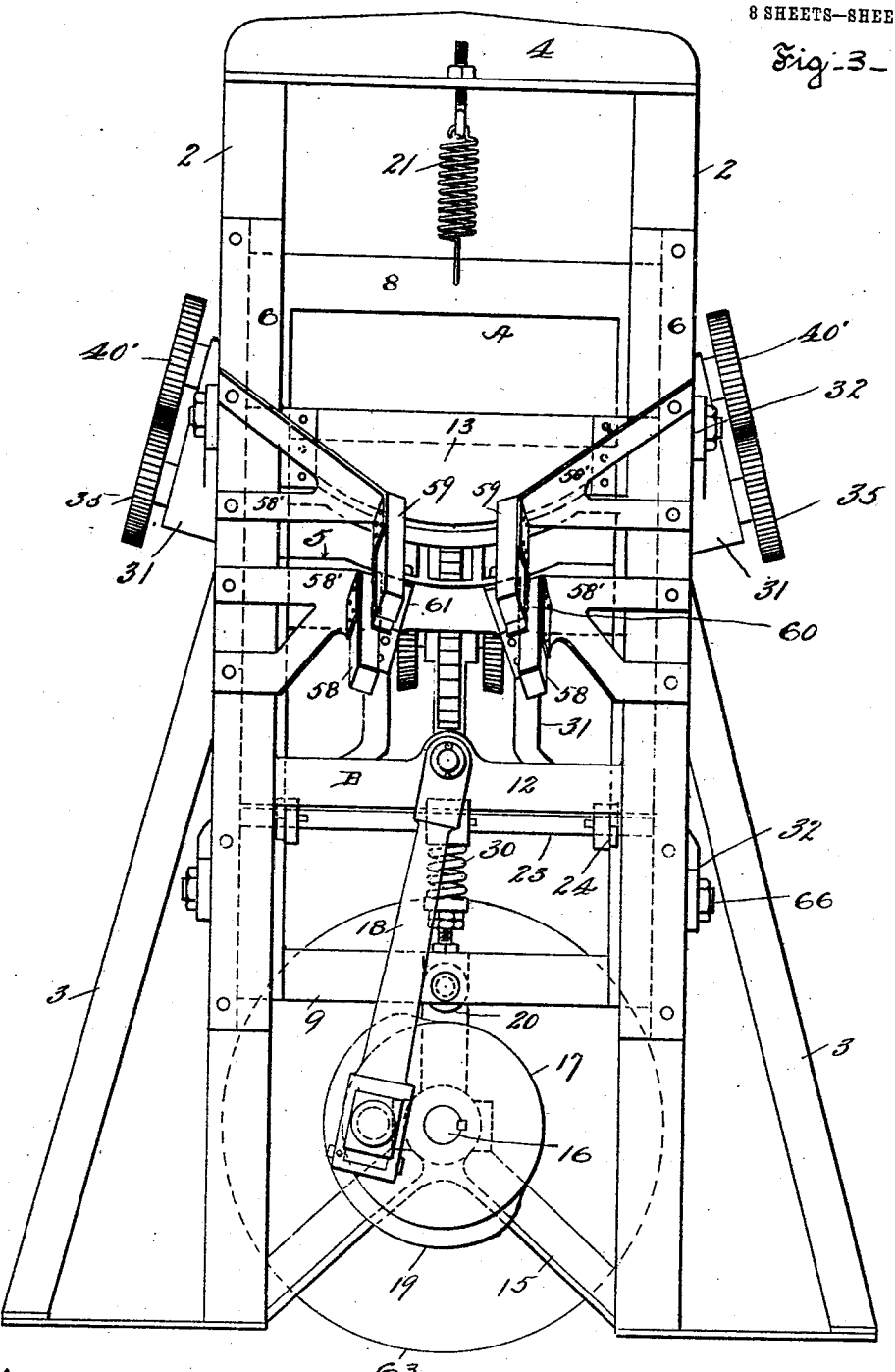

L. Y. WILLIAMS.
MACHINE FOR MAKING HEAD LININGS.
APPLICATION FILED APR. 17, 1906. RENEWED MAY 29, 1908.

908,720.

Patented Jan. 5, 1909.
8 SHEETS—SHEET 4.

L. Y. WILLIAMS.
MACHINE FOR MAKING HEAD LININGS.
APPLICATION FILED APR. 17, 1906. RENEWED MAY 29, 1908.

908,720.

Patented Jan. 5, 1909.
8 SHEETS—SHEET 6.

Witnesses—
Herman H. Martin
C. K. Davies

Inventor—
L. Y. Williams.
By F. E. Stebbins,
Atty.

L. Y. WILLIAMS.
MACHINE FOR MAKING HEAD LININGS.
APPLICATION FILED APR. 17, 1906. RENEWED MAY 29, 1908.

908,720.

Patented Jan. 5, 1909.
8 SHEETS—SHEET 7.

L. Y. WILLIAMS.
MACHINE FOR MAKING HEAD LININGS.
APPLICATION FILED APR. 17, 1906. RENEWED MAY 29, 1908.
908,720.
Patented Jan. 5, 1909.
8 SHEETS—SHEET 8.
Fig. 15.
Fig. 16.
Fig. 17.
Fig. 18.
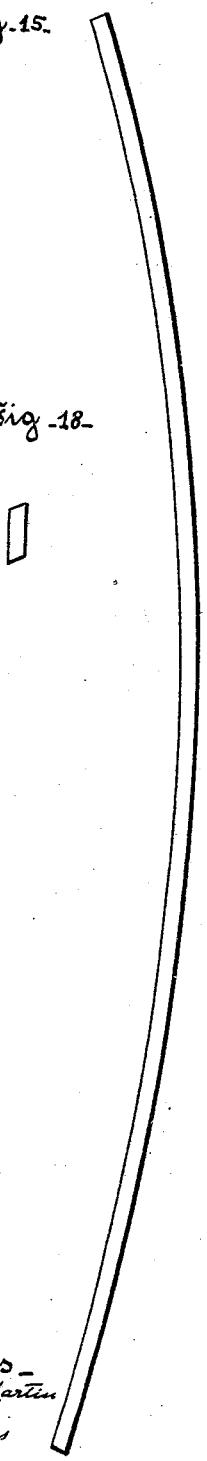
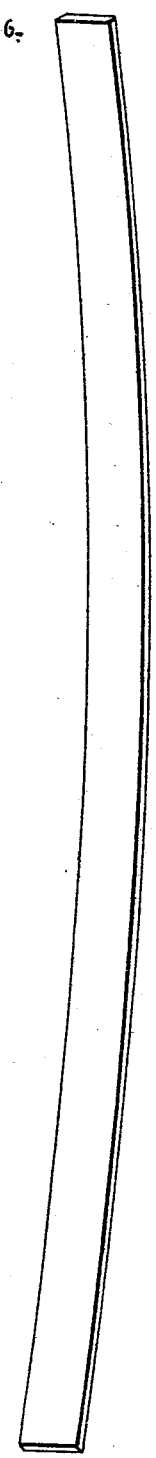
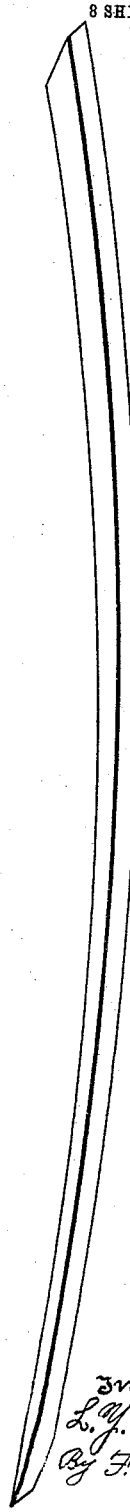
Witnesses—
Herman H. Martin
C. K. Davies
Inventor—
L. Y. Williams,
By F. E. Stebbins
Atty.

UNITED STATES PATENT OFFICE.

LACEY Y. WILLIAMS, OF TOLEDO, OHIO.

MACHINE FOR MAKING HEAD-LININGS.

No. 908,720.　　　Specification of Letters Patent.　　　Patented Jan. 5, 1909.

Application filed April 17, 1906, Serial No. 312,206. Renewed May 29, 1908. Serial No. 435,693.

*To all whom it may concern:*

Be it known that I, LACEY Y. WILLIAMS, a citizen of the United States, residing at Toledo, in the county of Lucas and State of Ohio, have invented new and useful Improvements in Machines for Making Head-Linings, of which the following is a specification.

My invention relates to a machine for making head linings for barrels and the like, the object being the production of a machine by which thin boards may be fashioned into head linings, each lining to be longitudinally curved or concavo-convex in general shape, the edges curved or concavo-convex, and a cross section of the same rhomboidal.

The invention consists, objectively, in a machine comprising means or mechanism for intermittently feeding thin boards disposed in layers obliquely into the path of a movable knife or cutting edge; means or mechanism for holding the layers while they are being cut, or pressing the said layers to a concavo-convex shape and holding them while being cut; means or mechanism for operating a knife or cutting edge; and means for holding the linings when cut in parallel layers so they may be removed and secured together in compact bundles.

It further consists in a machine comprising means or mechanism for reciprocating a knife or cutting edge, and means for intermittently delivering a layer of thin boards obliquely to the path of the movable knife.

Finally, it consists in certain novelties of construction and combinations and arrangements of parts as hereinafter set forth and claimed.

The accompanying drawings illustrate an example of the physical embodiment of the invention constructed according to the best of the several modes I have so far devised for the practical application of the principle.

Figure 6:
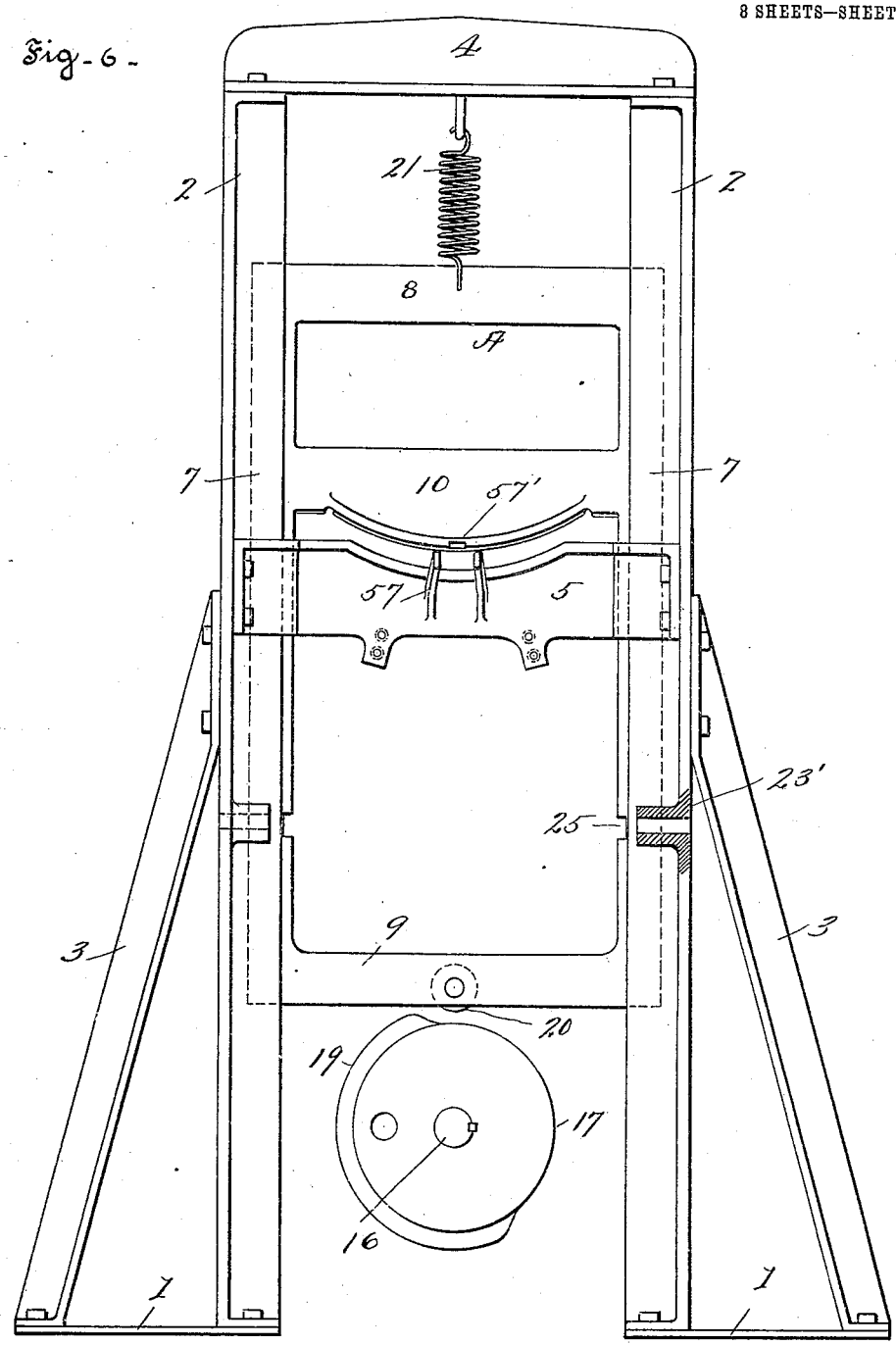
Figure 7:
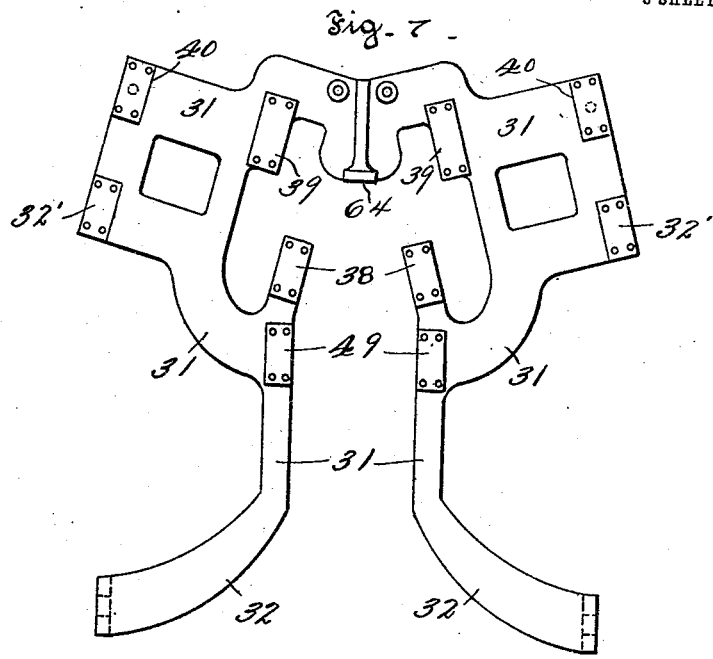
Figure 8:
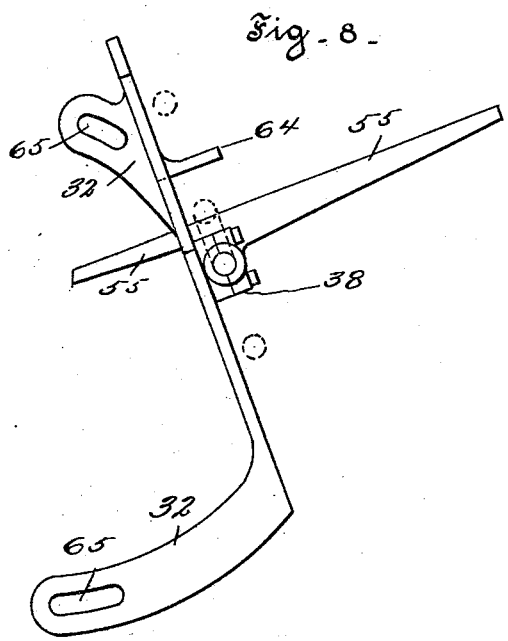
Figure 9:
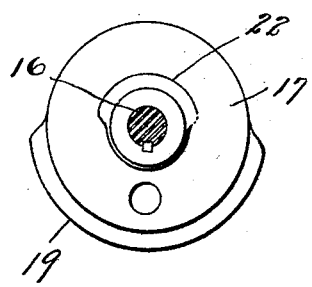
Figure 10:
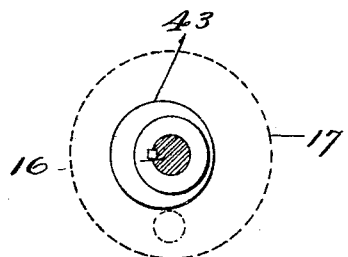
Figure 11:
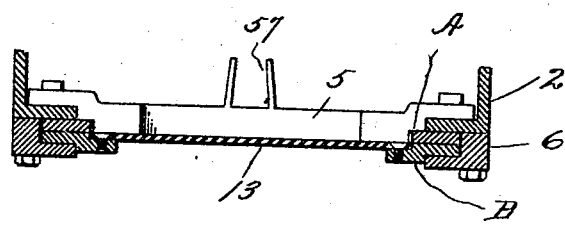
Figure 12:
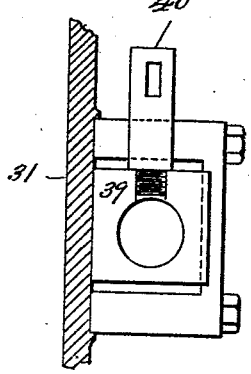
Figure 13:
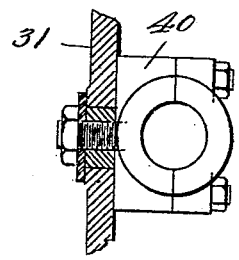

Figure 1 is a longitudinal vertical section through a machine embodying my invention. Fig. 2 is a rear elevation of the same. Fig. 3 is a front view of the machine. Fig 4. is a side elevation of a pressure foot arm with its free end projected into a notch formed in the sides of the vertical members of the pressure foot frame. Fig. 5 shows the front of the machine frame with the knife frame in position thereon and the concave cutting ledge. Fig. 6 is a rear elevation of the machine frame showing the convex pressure foot, pressure foot frame and the concave cutting ledge. Fig. 7 is a plan view of the bracket frame with the other mechanism removed. Fig. 8 is a side elevation of the bracket frame showing one of the bed arms or platen in position. Fig. 9 is a plan view of the pressure cam for the pressure foot showing the relative position of the same to the crank pin and the lifting cam for the pressure foot. Fig. 10 is a plan view showing the feed eccentric in its relative position to the crank pin. Fig. 11 is a section through a frame upright showing the ways for the knife, and the pressure foot frame, also the concave cutting ledge fixed to the upright. Fig. 12 is a side elevation of one of the weight pressed bearings for the upper feed roller shaft. Fig. 13 is a side elevation of the rocking bearing for the upper shaft. Fig. 14 is a side view of a portion of the receiving arms, showing the finished head lining yieldingly held in position ready for bundling. Fig. 15 is an edge view of a head lining. Fig. 16 is a side view of a head lining showing its edge curvature form. Fig. 17 is an isometric view of a head lining. Fig. 18 is an end view of a head lining showing its beveled edges.

The frame of the machine comprises a flat base plate 1, angle iron uprights 2 secured to the base, braces 3 for the uprights, an angular cross bar 4 connecting the top of the uprights, and an intermediate plate 5 connected to the uprights as shown and constituting the fixed cutting ledge of the machine, its top ledge or surface being curved or in the shape of a segment of a circle and also inclined. The front face of each upright is provided with angular bars 6 forming recesses between themselves and the flanges of the uprights and within which recesses or ways a reciprocating pressure foot frame A, and a reciprocating knife frame B are held and guided. (See Fig. 11.)

The pressure foot frame A comprises side members 7, which are integrally cross-connected by the top bar 8, a bottom bar 9, and the pressure foot 10 with its lower surface convex or curved in shape and also inclined. This pressure foot is located a suitable distance above the concave cutting ledge.

The knife frame comprises uprights 11 and the integral bottom cross bar 12. The tops of each upright are joggled outward to let in the knife 13 flush with the rear surface of the frame, said knife being parallel and preferably in frictional contact with the pressure foot. At the upper ends of standards 14 and 15 are bearings within which a main shaft 16 is journaled and provided with a crank disk 17 having a crank pin. A connecting rod 18 couples the bottom cross bar 12 of the knife frame to the crank pin. The rim of the crank disk is provided with a cam 19 which is adapted to lift the pressure foot frame A when it comes into contact with a roller 20 which is pivoted to the bottom cross bar 9 of the pressure foot frame. The weight of the pressure foot frame upon the roller pin may be partly relieved by a suspension spring 21 which is adjustably coupled by a bolt to the main frame cross bar 4 and to the top cross bar 8 of the pressure foot frame. Positive downward pressure upon the pressure foot frame exerted by a mechanism comprising a cam 22 fixed to the drive shaft 16, a rock shaft 23 journaled in bearings 23' on the uprights 2, arms 24 fixed to the shaft at the ends near the upright and arranged to extend into notch 25 formed in the edges of the respective sides of the pressure foot frame, an arm 26 fixed centrally of the rock shaft, and a push rod 27 arranged to contact with said arm 26 when lifted by the cam. The push rod is slidably mounted in ways 28 formed in the bracket extension 29 of the bearing 14, and by interposing an adjustable compressible spring 30 between the push bar and the rock arm 26, the pressure may be suitably adjusted.

A bracket frame 31 having four side arms 32 is located at the rear of the uprights, and adjustably connected thereto at a variable angle. This bracket frame is provided with fixed bearings 38 which are so disposed as to journal the lower feed shafts 33 at an angle to flex the thin boards to the curvature of the cutting ledge. Each shaft is provided with a serrated feed roller 34, and a spur wheel 35. A top feed roller 36 is mounted to each of the respective shafts 37, which are each journaled in a sliding bearing 39 and a rock bearing 40, each shaft also having a spur wheel 40' arranged to mesh with the respective spur wheel 35 on the lower shaft. The sliding bearings are each provided with a slotted pin 40ª through which is projected a lever 41. These levers 41 are pivoted to the bracket frame and are each provided with a movable weight 42.

The driving mechanism for the feed rollers consists of an eccentric 43 on the drive shaft 16, pitman 44, pull rod 45, having a pawl 46 arranged to downwardly engage a ratchet wheel 47 which is fixed to a shaft 48 journaled in bearings 49 and having also mounted thereon bevel gears 50 which mesh with bevel gears 51 on the respective driven roller shafts 33.

To permit adjustment of the eccentric feed mechanism to the adjustable angle of the bracket frame, the eccentric 43 is made movable along a splined portion 52 on the drive shaft 16, and pull rod 45 is held in a sleeve 53 having an arm 54 movable in the bracket extension 54' of the bearing 15.

The thin boards are advanced to the feed rollers upon arms or bed platen 55, and in the gap between the feed rollers and in front of the pressure foot. The boards are pressed downward by a spring 56, secured to projection 64 upon bed or platen 55 and also arms 57 extending from the rear of the cutting ledge. The end of the spring is held in a notch 57' formed in the pressure foot. The strips cut from the thin boards, now finished head linings, are delivered between inclined arms 58 and 59 which are secured to the uprights 2 of the frame by means of the hangers 58'. The top arm 59 is provided at the under side with a series of flat steel springs 60 secured at their upper ends, the lower ends being free and pressing downwards on the top of the head linings thereby holding them in their upright and regular positions as they are advanced down the inclined arms. By this arrangement the head linings can readily be placed in bundles collectively, without the handling of each head lining separately. The fixed cutting ledge 5 is also provided with springs 61 fixed on its face, each spring having a lip 62 adapted to bridge the knife gap between the cutting ledge and the lower arms 58. The spring is displaced when the knife comes down and returns to its original position when the knife passes upwardly. When the knife is at the end of the upward stroke, the pressure foot 10 is released to permit the feed rollers 34 and 36 to advance the boards a suitable distance under the knife, the distance being determined by the pitch of the teeth of the ratchet wheel 47. When the feed is completed the pressure foot is lowered to bear upon the top of the boards, and is forcibly held in this position by the action of the pressure of the cam 22. Immediately following the forcible bearing of the pressure foot on the top of the boards, the knife cuts down through the boards, detaching strips from the boards projecting free from the pressure foot. The pressure foot is forcibly held upon the top of the boards until the knife in its upward return has passed above the top of the boards, thereupon the pressure foot is released and lifted above the boards by the lifting cam 19, the feed motion being effective during the interval when the pressure foot is in the released position and the knife is disposed above the top of the boards. When the thin sheets of wood are held at an angle upon this concave cutting ledge 5 and cut, the edge curvature and the beveled edges of the head-lining (Figs. 15, 16, 18) are produced at one stroke of the clipping mechanism, the degree of edge curvature depending upon the arc of the cutting ledge and the angle relative to the path of the knife at which the boards are held, the bevel of the head lining being governed by the relative position of the bed arms or platen 55 which are adjustable relative to the clipping mechanism. That is to say, by increasing or decreasing the arc of the cutting ledge (without changing the angle) the edge curvature is obtained and may be varied by increasing or decreasing the arc, also this edge curvature may be somewhat increased or decreased by varying the angle at which the thin boards are held to the arc. The extent of bevel of the head lining will depend entirely upon the angle at which the thin boards of wood are held to the line of travel of the clipping mechanism. When the knife 13 passes down, cutting off the strip portion of the boards, now completed head linings, the preceding strips are forced by the bevel of the knife across the gap between the cutting ledge 5 and the delivery arms 58 and 59, the bottom of the head linings during the clipping operation being supported by the lips 62 of the springs 61, which remain in contact with and act as auxiliaries to the cutting ledge, until the bevel of the knife has passed through the boards and enters between the springs and the cutting ledge which action forces the springs away from the cutting ledge and the delivery arms. Upon the upward movement of the knife the springs are permitted to return in contact with the face of the cutting ledge.

The thin sheets of boards are shown by Fig. 1 of the drawings in the positions they occupy when ready for delivery by the clipping mechanism. They are arranged in layers and are flat or unbent. In some cases they may be bent or flexed to a concavo-convex shape before being placed upon the delivery platen, but when steamed or wet this is not necessary. The grain of the wood should extend longitudinally of the sheet, as is obvious, and the successive layers should not overlap. Below the knife are shown the cut linings held in layers by the springs.

From the foregoing description taken in connection with the drawings, it becomes obvious that I have produced a machine which fulfils the conditions set forth as the object of my invention.

While I have disclosed but one example of the physical embodiment of my invention and one complete mode of the application of the principle, I do not limit the scope of my invention to such embodiment or mode of applying the principle inasmuch as the principle may be applied in other modes. Means or mechanism may be substituted for those shown for performing the several functions, and parts be abstracted or added or modified, as is obvious, without constituting substantial departures.

What I claim is:

1. The combination in a machine for cutting head linings, of a bed or platen having a receiving portion and a delivering portion; a movable knife or cutter located between said portions and suitably supported to clip strips from the sheets of material; and means in connection with the delivering portion of the table adapted to yieldingly press upon the tops of the cut linings to hold said linings substantially in parallel positions.

2. The combination in a machine for cutting head linings, of a bed or platen having a receiving portion and a delivering portion; a movable knife or cutter located between said portions and suitably supported to clip strips from the sheets of material; and means in connection with the delivering portion of the table comprising springs adapted to press upon the tops of the cut linings to hold the same substantially in parallel positions.

3. The combination in a machine for cutting head linings, of a bed or platen having a receiving portion and a delivering portion; a movable knife or cutter located between said portions and suitably supported to clip strips from the sheets of material; and means in connection with the delivering end of the table or platen for frictionally engaging the surfaces of the cut linings to hold them substantially in alinement.

4. The combination in a machine for cutting head linings, of a bed having an inclined receiving portion for the uncut sheets of material, and a delivery portion for the material when cut; a cutter located between said portions and movable in a plane oblique to the receiving portion of the bed; means for operating the cutter; and means in connection with the delivery portion of the bed adapted to yieldingly press upon the tops of the cut linings to hold said linings substantially in parallel positions.

5. The combination in a machine for cutting head linings, of a bed having an inclined receiving portion for the uncut sheets of material, and a delivery portion for the material when cut; a cutter located between said portions and movable in a plane oblique to the receiving portion of the bed; means for holding the sheets while being cut; and means in connection with the delivery portion of the bed adapted to yieldingly engage the surfaces of the cut linings and to hold them substantially in alinement.

6. The combination in a machine for cutting head linings, of a bed having an inclined receiving portion for the uncut sheets of material, and a delivery portion for the material when cut; a cutter located between said portions and movable in a plane oblique to the receiving portion of the bed; and means in connection with the delivery portion of the bed comprising springs adapted to press upon the tops of the cut linings to hold the same substantially in parallel positions.

7. The combination in a machine for cutting head linings, of a bed having an inclined receiving portion for the uncut sheets of material, and a delivery portion for the material when cut; a cutter located between said portions and movable in a plane oblique to the receiving portion of the bed; and means in connection with the delivery portion of the bed for frictionally engaging the surfaces of the cut linings to hold them substantially in alinement.

8. A machine for making head linings comprising cutting mechanism and means for operating the same; a cutting ledge with a curved surface; a pressure foot; an inclined bed or platen along which a sheet or sheets of wood may be moved obliquely to the cutting mechanism; a receiving bed or platen to receive the cut linings; and arms with springs for holding the linings in position.

9. A machine for making head linings comprising cutting mechanism and means for operating the same; an inclined bed or platen along which sheets of wood move to the cutting mechanism; a receiving bed or platen for the cut linings; and arms above the bed provided with means for holding the linings in position.

10. A machine for making head linings comprising cutting mechanism and means for operating the same; an inclined bed or platen along which sheets of wood move to the cutting mechanism; means for moving the sheets; a receiving bed or platen for the cut linings; and arms 59 with springs for engaging the top surfaces of the said linings.

11. A machine for making linings comprising a frame provided with a reciprocating cutting edge; a concave cutting ledge inclined toward the cutting edge; feed mechanism adapted to advance thin boards over the concave cutting ledge; and a receiving bed or platen for the detached portions of the boards, said platen having means adapted to yieldingly retard the detached portions and maintain their alinement.

12. A machine for making linings comprising cutting mechanism; feed mechanism; and pressure foot mechanism; said mechanisms, respectively, provided with a knife, rollers and a curved surface to feed, shape and cut thin boards of wood into sections which are transversely curved, which have an edge curvature and beveled edges; and receiving ways for the cut sections, which ways have means to maintain the sections in alinement.

13. A machine for making linings comprising a frame, cutting mechanism, feed mechanism consisting of rollers arranged at an angle to the frame adapted to hold thin boards of wood in a concavo-convex shape and to advance the boards; a bed or feed platen; a convex pressure foot adapted to hold the boards during the cutting operation; a concave cutting ledge and receiving ways arranged at an angle to the path of the cutting mechanism and adapted to receive and hold the cut sections of thin boards in layers.

14. The combination with a machine for making head linings having cutting mechanism, feed mechanism, pressure foot mechanism and means for operating said mechanisms, of delivery arms 58 and 59 for retaining the head linings after being cut, the arms 59 being located parallel with the arms 58 and above the same.

15. The combination with a machine for making head linings having cutting mechanism, feed mechanism, pressure foot mechanism, and means for operating said mechanisms, of delivery arms 58 and 59 arranged parallel, the arms 59 being located above arms 58, and springs secured to the arms for the purpose set forth.

16. A machine for making head linings comprising cutting mechanism and means for operating the same; feed mechanism adapted to advance thin boards of wood bent to a curved shape beneath the cutting mechanism; receiving ways for the cut linings having means adapted to bear against the linings; and means adapted to movably bridge the gap between the cutting mechanism and the receiving ways.

17. The combination with a machine for making head linings having cutting mechanism, feed mechanism, pressure foot mechanism, means for operating said mechanisms, a cutting ledge, and delivery arms or platen, of springs 61 to bridge the gap between the cutting ledge and delivery arms or platen.

18. A machine for making head linings comprising cutting mechanism; means adjustable at various angles in its relation to the cutting mechanism for delivering sheets of wood to the cutting mechanism; and means for forming a transverse curvature in the sheets whereby strips of wood are produced each of which is curved lengthwise and has curved edges and is rhomboidal in cross section.

19. A machine for making head linings comprising cutting mechanism; feed mechanism adapted to flex thin boards of wood lengthwise and across the grain and advance them in a curved shape to the cutting mechanism; and receiving ways for the cut linings having means adapted to bear against the said cut linings and maintain them in parallel positions.

20. A machine for making head linings comprising a frame provided with cutting mechanism; means adapted to feed concavo-convex thin boards of wood to the cutting mechanism, said means comprising lower feed rollers and upper feed rollers adapted to bear upon the boards; means for transmitting an intermittent motion to the feed rollers; and means for holding the boards while being cut.

21. A machine for making head linings comprising a frame provided with a movable cutting edge; a fixed cutting ledge having its top surface in the form of a segment of a curve; a bracket coupled to the frame carrying rollers to hold thin boards of wood bent crosswise of the grain and advance the boards upon the cutting ledge; means for operating the feed rollers; and means for holding the boards while being cut.

22. A machine for making head linings provided with a movable cutting edge; a concave cutting ledge; an adjustable bracket with feed rollers thereon to hold thin boards of wood bent lengthwise and across the grain and advance the boards upon the concave cutting ledge; and a reciprocating pressure foot with a convex surface adapted to bear upon the flexed boards in advance of the cutting movement.

23. The combination with a machine for making head linings having cutting mechanism and pressure foot mechanism and operating substantially as set forth, of uprights; an adjustable frame having slotted arms mounted upon the uprights and carrying gear wheels and feed rollers; and means for intermittently operating the gear wheels and feed rollers.

24. The combination with a machine for making head linings having cutting mechanism and pressure foot mechanism, of a feed mechanism comprising an adjustable frame with rollers mounted on inclined shafts supported by pivoted and sliding bearings and with weighted arms for bearing the rollers upon the material while being fed to the cutting mechanism.

25. A machine for making head linings comprising a frame; a reciprocating cutting edge and means for operating the same; a cutting ledge having its top surface in the shape of a segment of a curve; a bracket coupled to the frame and carrying feed rollers mounted upon inclined shafts to hold thin boards of wood bent crosswise of the grain and advance the boards upon the cutting ledge; and means for operating the rollers.

26. The combination in a machine for making head linings, of a reciprocating frame carrying a knife, a reciprocating frame with a pressure foot, a bed to receive the sheets of material to be cut, a feed mechanism provided with means for holding sheets of material in concavo-convex shape and delivering the sheets into the path of the knife, a rotary shaft, means connecting the shaft with the knife frame, pressure foot frame, and feed mechanism, a crank operating the knife frame, and cams on the shaft for operating the pressure foot frame and feed mechanism, the crank and cams being so relatively disposed one to another that the feed mechanism, pressure foot mechanism, and knife are successively operated to feed the sheets of material, hold the same, and cut portions therefrom.

27. The combination in a machine for making head linings, of cutting mechanism, pressure foot mechanism, feed mechanism provided with means for holding sheets of material in concavo-convex shape, a rotary shaft, and means connecting said shaft and the several mechanisms, said means being so arranged that when the cutting mechanism is being raised the feed mechanism advances the material to be cut into the path of the cutting mechanism, thereafter lowers the pressure foot mechanism, and then lowers the cutting mechanism.

28. The combination in a machine for making head linings, of a rotary shaft, a knife operated by the shaft, pressure foot mechanism, a curved cutting ledge, feed mechanism to hold and deliver sheets of curved wood; both said pressure foot mechanism and said feed mechanism being operated by cams upon the rotary shaft; and receiving and delivering beds inclined to the knife.

29. The combination in a machine for making head linings, of cutting mechanism embracing a frame and knife, pressure foot mechanism embracing a frame independent of the knife frame, feed mechanism provided with means for holding and advancing sheets of material bent to a curved shape; a rotary shaft, and means for operating the feed mechanism, pressure foot mechanism, and clipping mechanism successively one after the other by the rotary shaft.

30. A machine for making head linings comprising cutting mechanism and means for operating the same, a cutting ledge with a curved surface, means for holding and delivering in a direction oblique to the travel of the cutting mechanism a thin sheet or sheets of wood bent to a concavo-convex shape and to a position in the path of the cutting edge of the cutting mechanism, and reciprocating means for holding the sheets while being cut, said means being operated by a cam upon the main shaft of the machine.

31. A machine for making head linings comprising cutting mechanism and mechanism for operating the same; a cutting ledge with a dished or concave top surface; a pressure foot; means operated by a rotary shaft for holding the pressure foot in a lowered position; means for raising the pressure foot; a feed platen, and means for adjusting the feed platen so it may occupy various angular positions relative to the plane of the cutting mechanism.

32. A machine for making head linings comprising a cutter; a cutting ledge with a curved surface; a pressure foot for holding sheets of material in a concavo-convex shape upon the said curved surface of the ledge; means for reciprocating the pressure foot; means for operating the cutter; and means for holding the sheets of material bent to a concavo-convex shape and intermittently delivering them into the path of the cutter.

33. A machine for making head linings comprising a cutting ledge with a curved surface; a pressure foot with a curved surface for holding concavo-convex sheets of material upon the curved surface of the ledge; a cutter; means for operating the cutter; and mechanism for holding the sheets of material bent to a concavo-convex shape and intermittently delivering the sheets into the path of the cutter.

34. A machine for making head linings comprising a cutting ledge with a curved and inclined surface; a pressure foot for holding concavo-convex sheets of material upon the said curved and inclined surface of the ledge; means for reciprocating the pressure foot; a cutter; means for operating the cutter; and means for holding the sheets of material bent to a concavo-convex shape and intermittently delivering the sheets of material into the path of the cutter.

35. A machine for making head linings comprising a cutting ledge with a curved and inclined surface; a pressure foot with a curved and inclined surface for holding sheets of concavo-convex material upon the curved and inclined surface of the ledge; a cutter; means for operating the cutter; and mechanism for holding the sheets of material bent to a curved shape and intermittently delivering them into the path of the cutter.

36. A machine for making head linings comprising cutting means and means for operating the same; means for holding the sheets of material bent to a curved shape and intermittently delivering a thin sheet or sheets of material to the cutting means; a cutting ledge having a concave surface; a pressure foot having a convex surface; and means for holding the cut linings parallel.

37. The combination in a machine for making head linings, of cutting mechanism and means for operating the same; intermittent feeding mechanism and means for operating the same; a reciprocating presser foot frame with a presser foot having a curved surface and means for reciprocating the frame and foot; and a cutting ledge with a curved surface; the curved surface of the pressure foot and cutting ledge being counterparts.

38. A machine for making head linings comprising cutting mechanism and means for operating the same; means for holding and intermittently delivering in a direction oblique to the travel of the cutting mechanism a thin sheet or sheets of wood bent to a curved shape to a position in the path of the cutting mechanism; and means for holding the piece or pieces of wood in a concavo-convex shape during the act of cutting.

39. A machine for making head linings comprising mechanism for cutting and means for operating the same; and means for delivering at various angles to the travel of the cutting mechanism a thin sheet or sheets of wood each having a concavo-convex shape to a position in the path of the cutting edge of the cutting mechanism.

40. A machine for making head linings comprising a frame provided with cutting mechanism; means for operating the cutting mechanism; a ledge with a curved surface; feed mechanism; means for operating the feed mechanism, which mechanism is adapted to intermittently advance upon the ledge and to the cutting mechanism thin boards of wood bent into a curved shape; a frame carrying a pressure foot with a curved surface, said frame being movably mounted upon uprights and arranged so the pressure foot will forcibly bear upon the boards during the cutting operation; and means for operating the pressure foot frame.

41. A machine for making head linings comprising cutting mechanism embracing a knife and means for operating the same; a cutting ledge having a surface in the shape of the segment of a curve and inclined toward the cutting edge of the cutting knife; feed mechanism; means for intermittently operating the feed mechanism to advance concavo-convex shaped boards at an angle to the path of the knife; and means for holding the boards in their concavo-convex shape when being cut.

42. A machine for making linings comprising cutting mechanism and means for operating the same; a ledge with a curved surface; feed mechanism adapted to advance concavo-convex thin boards of wood to the cutting mechanism; a pressure foot and means engaging the said pressure foot and holding it upon the thin boards of wood and maintaining them in a concavo-convex shape during the act of cutting.

43. The combination in a machine for making head linings, of a cutting ledge with a curved surface; a rotary shaft; a reciprocating knife operated by the shaft; pressure foot mechanism, said foot having a curved surface; feed mechanism; and a delivery platen and receiving bed both inclined to the plane of the knife; the said pressure foot mechanism being operated by a cam upon the rotary shaft.

44. The combination with a machine for making head linings, of cutting mechanism; a concave shaped cutting ledge with an inclined surface; a pressure foot frame having a convex shaped pressure foot matching the concave shaped cutting ledge; and means for reciprocating the pressure foot frame.

45. A machine for cutting head linings comprising a cutter; a cutting ledge with a curved surface; a pressure foot; means for advancing thin sheets of material to the cutting ledge; means for operating the cutter and pressure foot; a receiving bed inclined to the path of the cutter; and an inclined delivery bed for receiving the cut linings.

In testimony whereof I affix my signature in presence of two witnesses.

LACEY Y. WILLIAMS.

Witnesses:
    MAY P. FOSTER,
    F. M. DOTSON.